(12) United States Patent
Hataida et al.

(10) Patent No.: US 8,837,505 B2
(45) Date of Patent: Sep. 16, 2014

(54) ARBITRATION METHOD, ARBITER CIRCUIT, AND APPARATUS PROVIDED WITH ARBITER CIRCUIT

(75) Inventors: Makoto Hataida, Kawasaki (JP);
Toshikazu Ueki, Kawasaki (JP);
Takayuki Kinoshita, Kawasaki (JP);
Yoshikazu Iwami, Kawasaki (JP);
Hidekazu Osano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 325 days.

(21) Appl. No.: 13/137,846

(22) Filed: Sep. 16, 2011

(65) Prior Publication Data

US 2012/0002677 A1 Jan. 5, 2012

Related U.S. Application Data

(63) Continuation of application No. PCT/JP2009/056671, filed on Mar. 31, 2009.

(51) Int. Cl.
*H04L 12/54* (2013.01)
*H04L 12/933* (2013.01)
*H04L 12/937* (2013.01)

(52) U.S. Cl.
CPC ............ *H04L 49/101* (2013.01); *H04L 49/253* (2013.01)
USPC .......................................... 370/418; 370/447

(58) Field of Classification Search
USPC .......... 370/412, 447, 427, 429, 462; 710/240, 710/309
See application file for complete search history.

(56) References Cited

U.S. PATENT DOCUMENTS

| | | | |
|---|---|---|---|
| 2002/0146022 A1* | 10/2002 | Van Doren et al. | 370/412 |
| 2003/0227901 A1 | 12/2003 | Kodialam et al. | |
| 2006/0155904 A1* | 7/2006 | Murakami et al. | 710/240 |
| 2007/0067528 A1* | 3/2007 | Schaffer et al. | 710/116 |
| 2008/0034140 A1 | 2/2008 | Kai | |

FOREIGN PATENT DOCUMENTS

| | | |
|---|---|---|
| JP | 10-254843 | 9/1998 |
| JP | 2001-22711 | 1/2001 |
| JP | 2004-102607 | 4/2004 |

OTHER PUBLICATIONS

Extended European Search Report issued Sep. 19, 2012 in corresponding European Patent Application No. 09842617.4.
International Search Report for PCT/JP2009/056671, mailed Jul. 7, 2009.

* cited by examiner

*Primary Examiner* — Donald Mills
*Assistant Examiner* — Henry Baron
(74) *Attorney, Agent, or Firm* — Staas & Halsey LLP

(57) ABSTRACT

An arbitration method includes a first process to perform a path control to transfer data from physically plural input ports logically having plural virtual channels to an arbitrary one of the plural output ports, wherein only one channel is selectable at one input port at an arbitrary point in time, by performing an arbitration among the channels of each of the plural input ports according to an arbitrary arbitration algorithm other than a time-division algorithm, and a second process to perform an arbitration among the plural input ports according to the arbitrary arbitration algorithm. The arbitrary arbitration algorithm used in the first and second processes is switched to the time-division algorithm for a predetermined time in response to a trigger.

15 Claims, 15 Drawing Sheets

| BUSY SIGNAL OF OUTPUT PORT DO | | 1 | 1 | 1 | | 1 | | 1 | | 1 | | 1 | | 1 | 1 | 1 | 1 | 1 | 1 | 1 |
|---|---|---|---|---|---|---|---|---|---|---|---|---|---|---|---|---|---|---|---|---|
| EXISTENCE OF RETRY INSTRUCTION | | | 1 | | 1 | | 1 | | 1 | | 1 | | 1 | | | | 1 | | 1 | |
| INPUT PORT AI | A10 | A11 | A11 | A11 | A12 | A12 | A12 | - | - | - | - | - | - | - | A20 | A21 | A21 | A22 | A22 | A22 |
| INPUT PORT BI | B10 | B10 | B10 | B10 | B10 | B10 | B10 | B10 | B10 | B10 | B10 | B10 | B10 | B10 | B20 | B20 | B20 | B20 | B20 | B20 |
| INPUT PORT CI | C10 | C10 | C10 | C10 | C10 | C10 | C10 | C10 | C10 | C10 | C10 | C10 | C10 | C10 | C20 | C20 | C20 | C20 | C20 | C20 |
| ARBITRATION RESULT | A1 | | A1 | | A1 | | | | | | | | | | A2 | | A2 | | A2 | |

ARBITRATION METHOD, ARBITER CIRCUIT, AND APPARATUS PROVIDED WITH ARBITER CIRCUIT

CROSS-REFERENCE TO RELATED APPLICATIONS

This application is a continuation application filed under 35 U.S.C. 111(a) claiming the benefit under 35 U.S.C. 120 and 365(c) of a PCT International Application No. PCT/JP2009/056671 filed on Mar. 31, 2009, in the Japanese Patent Office, the disclosure of which is hereby incorporated by reference.

FIELD

The present invention discussed herein relates to an arbitration method, an arbiter circuit, and an apparatus provided with arbiter circuit.

BACKGROUND

FIG. 1 is a block diagram illustrating an example of a parallel computer. A parallel computer 1 includes a plurality of System Boards (SBs) 12, a crossbar switch 14, and a plurality of Input Output Boards (IOBs) 15 that are connected as illustrated in FIG. 1. Each SB 12 includes a plurality of Central Processing Units (CPUs) 11, and a plurality of memories 13. Each IOB 14 includes a plurality of input parts and a plurality of output parts (or input output interfaces). The crossbar switch 14 includes an input port AI and an output port AO connected to one SB 12, an input port BI and an output port BO connected to the other SB 12, an input port CI and an output port CO connected to one IOB 15, and an input port DI and an output port DO connected to the other IOB 15.

The crossbar switch 14 includes the plurality of input ports and the plurality of output ports described above, and performs a routing (path control) in order to transfer packets as data from an arbitrary node, such as the SB 12 and the IOB 15, to another node. In order to avoid a deadlock, the crossbar switch 14 has a plurality of virtual channels for each port. In other words, the crossbar switch 14 physically includes a plurality of ports, and each port logically includes a plurality of channels (that is, virtual channels), but only one channel may be selected at one port at an arbitrary point in time.

An arbiter circuit in the crossbar switch 14, that performs an arbitration on the packets from the plurality of ports and the plurality of channels, ideally treats all ports and all channels equally. FIG. 2 is a diagram illustrating such an ideal arbiter circuit. In FIG. 2, an arbiter circuit 17 performs an arbitration process with respect to inputs of channels C0 and C1 from an input port AI, inputs of channels C0 and C1 from an input port BI, inputs of channels C0 and C1 from an input port CI, and inputs of channels C0 and C1 from an input port DI, and outputs a routing request (path control request) from one input port to an arbitrary output port based on a result of the arbitration process.

However, in actual circuit design, it is physically difficult to create the arbiter circuit 17 having the structure illustrated in FIG. 2, and it is also difficult to take into consideration the signal delay in the design. For this reason, an arbiter circuit having a 2-stage structure illustrated in FIG. 3 has been proposed.

FIG. 3 is a diagram illustrating an example of an arbiter circuit. In FIG. 3, queue arbiter circuits 18-1 select packets from queues AQ, BQ, CQ and DQ for each of the input ports AI, BI, CI and DI, and inter-port arbiter circuits 18-2 select one port from the plurality of input ports AI, BI, CI and DI. The queues AQ, BQ, CQ and DQ are retained in corresponding buffers (not illustrated) within the crossbar switch 14, and blocks identifying the queues AQ, BQ, CQ and DQ in FIG. 3 correspond to these buffers. Hence, an arbiter circuit 18 has the 2-stage structure formed by two kinds of arbiter circuits 18-1 and 18-2.

FIG. 4 is a diagram illustrating a structure of the queue arbiter circuit 18-1. As illustrated in FIG. 4, an arbitration algorithm equally arbitrates a set of queues for each of the channels C0 and C1. FIG. 4 illustrates a case in which the Least Recently Used (LRU) algorithm is used as the arbitration algorithm. Hence, a selector 181 selectively outputs one of the queues from the channels C0 and C1, depending on an operation result that is obtained by a LRU algorithm part 180 based on the LRU algorithm.

The illustration of a structure of the inter-port arbiter circuit 18-2 will be omitted, because the same arbitration algorithm as the queue arbiter circuit 18-1, such as the LRU algorithm, may be used for the arbitration with respect to a set of queues for each of the input ports AI, BI, CI and DI, in place of the set of queues for each of the channels C0 and C1. In a case in which the path control request (routing request) from the queue arbiter circuit 18-1 is not accepted for a long time and a stall state continues, due to insufficient resources and the like, a retry control is performed to once cancel the request and issue another request in order to prevent deadlock.

The arbiter circuit 18 described above may appear to perform the arbitration equally, however, when one focuses on a certain packet, a queue may not be output for a long time from the queue arbiter circuit 18-1 to the inter-port arbiter circuit 18-2, to thereby generate the so-called livelock. However, when a time-division algorithm is used for the arbitration algorithm in place of the LRU algorithm, the livelock may be prevented, but the arbitration time becomes long to deteriorate the performance of the parallel computer 1.

In the conventional arbitration method, the arbitration time becomes long when an attempt is made to prevent the livelock, and as a result, the performance of the parallel computer may deteriorate.

The applicants are aware of a Japanese Laid-Open Patent Publication No. 2001-22711.

SUMMARY

Accordingly, it is an object in one aspect of the embodiment to provide an arbitration method, an arbiter circuit, and an apparatus provided with the arbiter circuit, in which the increase of the arbitration time may be suppressed and the livelock may be prevented.

According to one aspect of the present invention, an arbitration method includes transferring data from a plurality of input ports each having a plurality of virtual channels of which only one channel is selectable at one input port at an arbitrary point in time, to an arbitrary output port amongst a plurality of output ports by performing an arbitration among the channels of each of the plurality of input ports according to an arbitrary arbitration algorithm other than a time-division algorithm; arbitrating among the plurality of input ports according to the arbitrary arbitration algorithm; and switching the arbitrary arbitration algorithm used in the transferring and the arbitrating to the time-division algorithm for a predetermined time in response to a trigger.

According to one aspect of the present invention, an arbiter circuit including a transfer circuit that transfers data from a plurality of input ports each having a plurality of virtual channels of which only one channel is selectable at one input port at an arbitrary point in time, to an arbitrary output port amongst a plurality of output ports by performing an arbitration among the channels of each of the plurality of input ports according to an arbitrary arbitration algorithm other than a time-division algorithm; an arbiter circuit that arbitrates among the plurality of input ports according to the arbitrary arbitration algorithm; and an arbitration switching circuit that switches the arbitrary arbitration algorithm used in the transfer circuit and the arbiter circuit to the time-division algorithm for a predetermined time in response to a trigger.

According to one aspect of the present invention, an apparatus for coupling a system having a plurality of processors and memories to an input output system having a plurality of input output interfaces, includes a plurality of input ports that each includes a plurality of virtual channels; a plurality of output ports; a transfer circuit that transfers data from the plurality of input ports each having a plurality of virtual channels of which only one channel is selectable at one input port at an arbitrary point in time, to an arbitrary output port amongst the plurality of output ports by performing an arbitration among the channels of each of the plurality of input ports according to an arbitrary arbitration algorithm other than a time-division algorithm; an arbiter circuit that arbitrates among the plurality of input ports according to the arbitrary arbitration algorithm; and an arbitration switching circuit that switches the arbitrary arbitration algorithm used in the transfer circuit and the arbiter circuit to the time-division algorithm for a predetermined time in response to a trigger.

BRIEF DESCRIPTION OF THE DRAWINGS

FIG. 9 is a diagram illustrating an arbitration result for each clock based on the LRU algorithm;

FIG. 10 is a diagram illustrating an arbitration result for each clock based on the time-division algorithm;

DESCRIPTION OF EMBODIMENTS

Preferred embodiments of the present invention will be described with reference to the accompanying drawings.

According to the disclosed arbitration method, arbiter circuit, and apparatus provided with the arbiter circuit, when performing a routing (path control) in order to transfer data from physically plural input ports logically having plural virtual channels to an arbitrary output port amongst plural output ports, only one channel is selectable at one input port at an arbitrary point in time. A first arbitration process performs the arbitration of the channels of each of the input ports according to an arbitrary arbitration algorithm other than the time-division algorithm, and a second arbitration process performs the arbitration of the input ports according to the arbitrary arbitration algorithm. In addition, the arbitration algorithm used in the first and second arbitration processes is switched to the time-division algorithm for a predetermined time in response to a trigger.

Hence, the increase in the arbitration time may be suppressed and the livelock may be prevented.

A description will now be given of embodiments of the disclosed arbitration method, arbiter circuit, and apparatus provided with the arbiter circuit, by referring to FIG. 5 and the subsequent figures.

Figure 1:
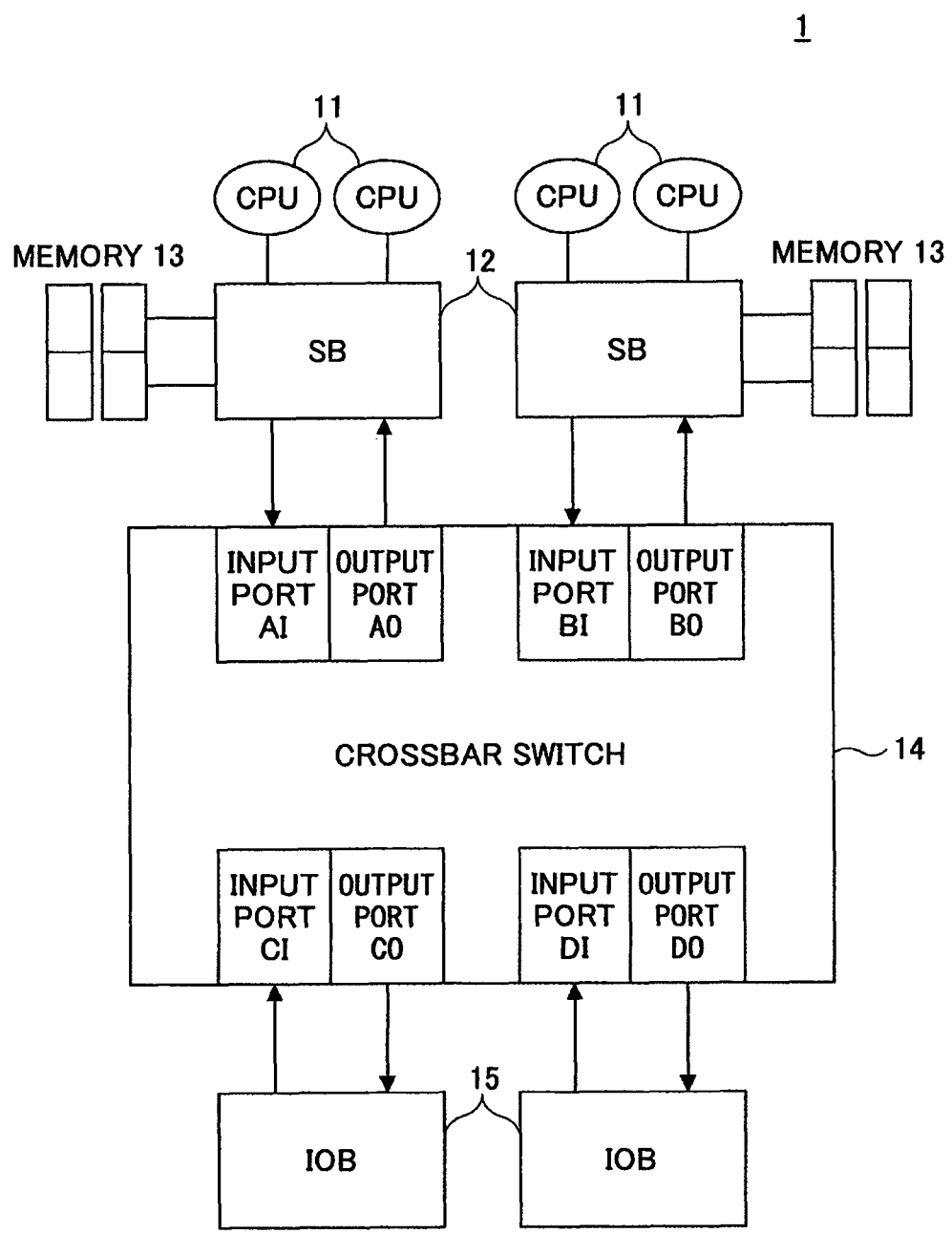
FIG. 1 is a block diagram illustrating an example of a parallel computer.
Figure 2:
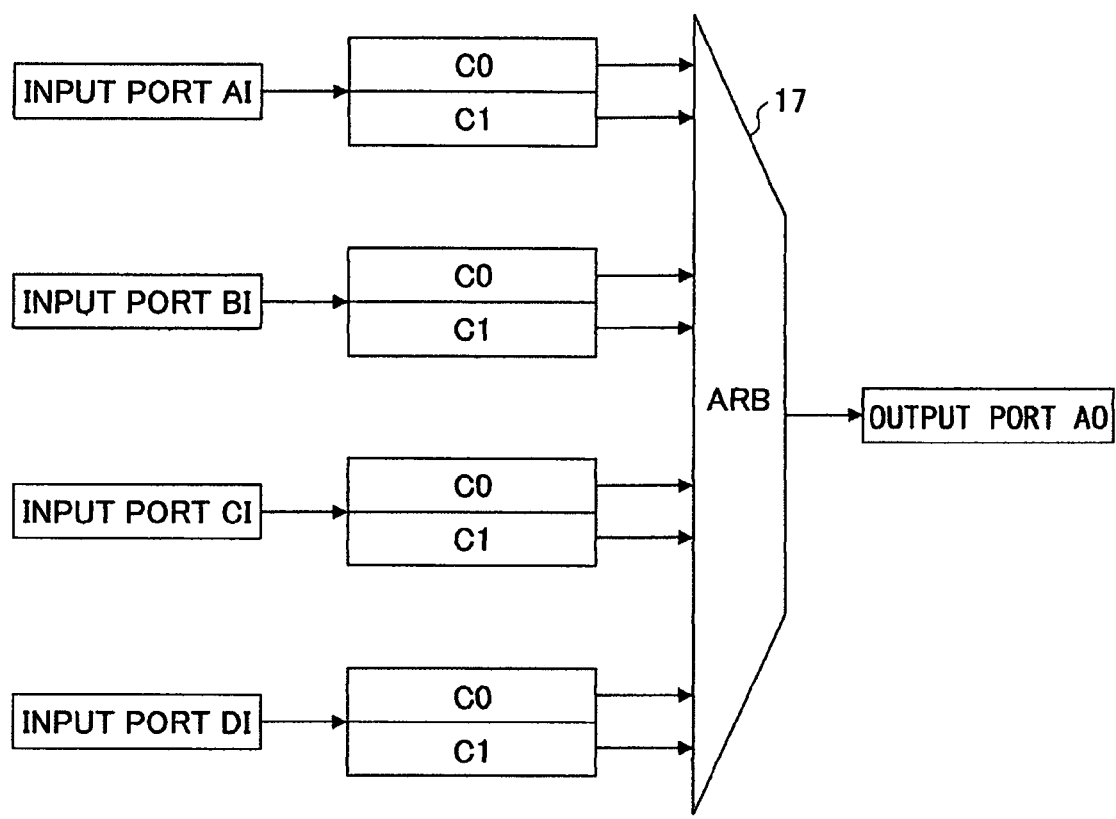
FIG. 2 is a diagram illustrating an ideal arbiter circuit.
Figure 3:
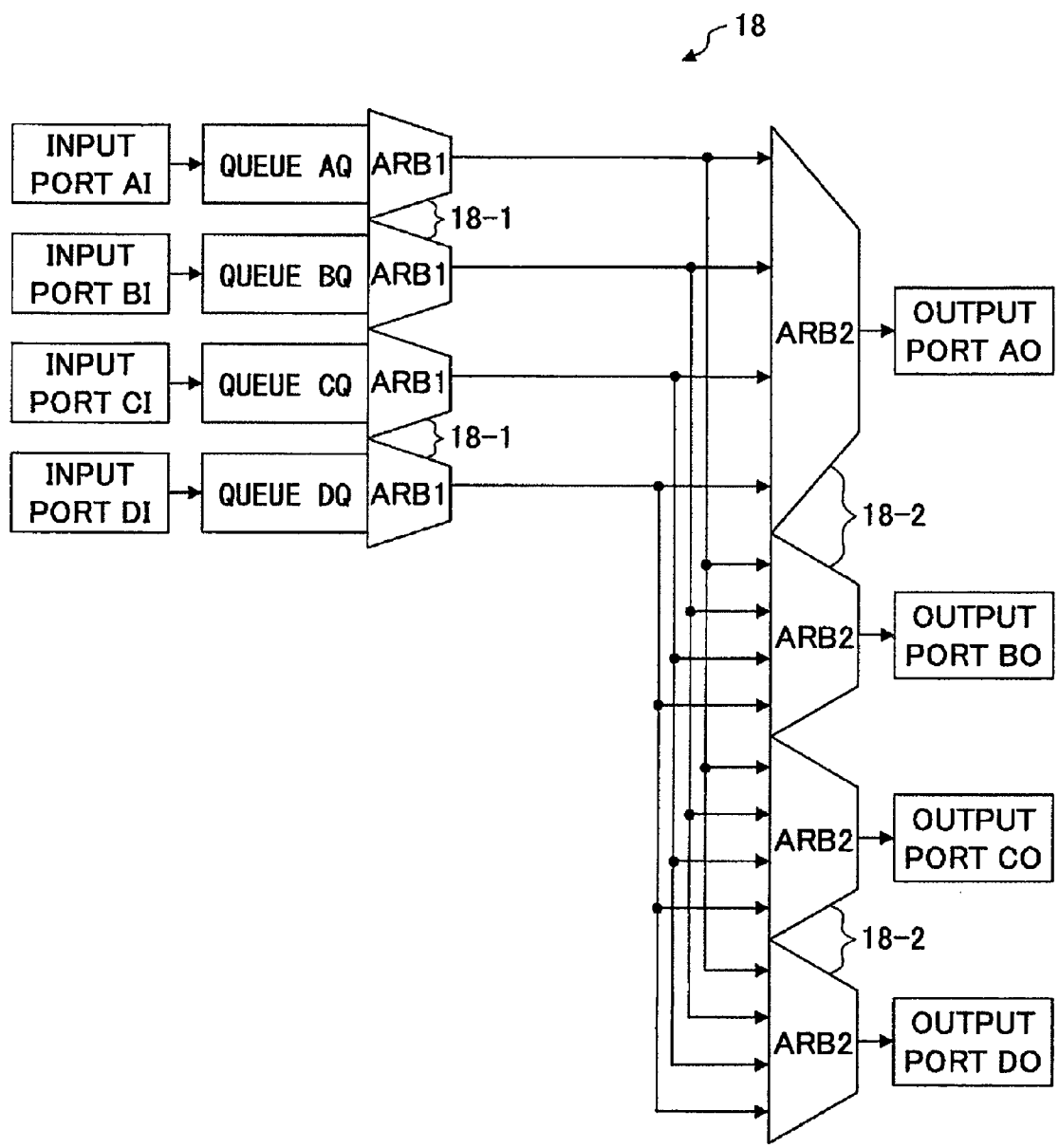
FIG. 3 is a diagram illustrating an example of an arbiter circuit.
Figure 4:
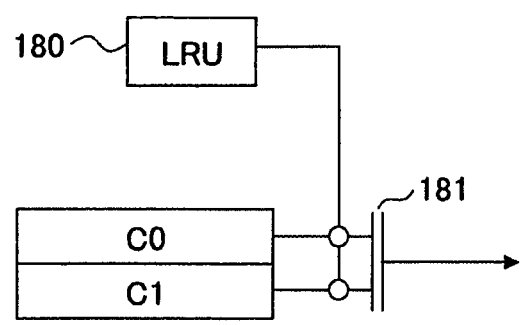
FIG. 4 is a diagram illustrating a structure of the queue arbiter circuit.
Figure 5:
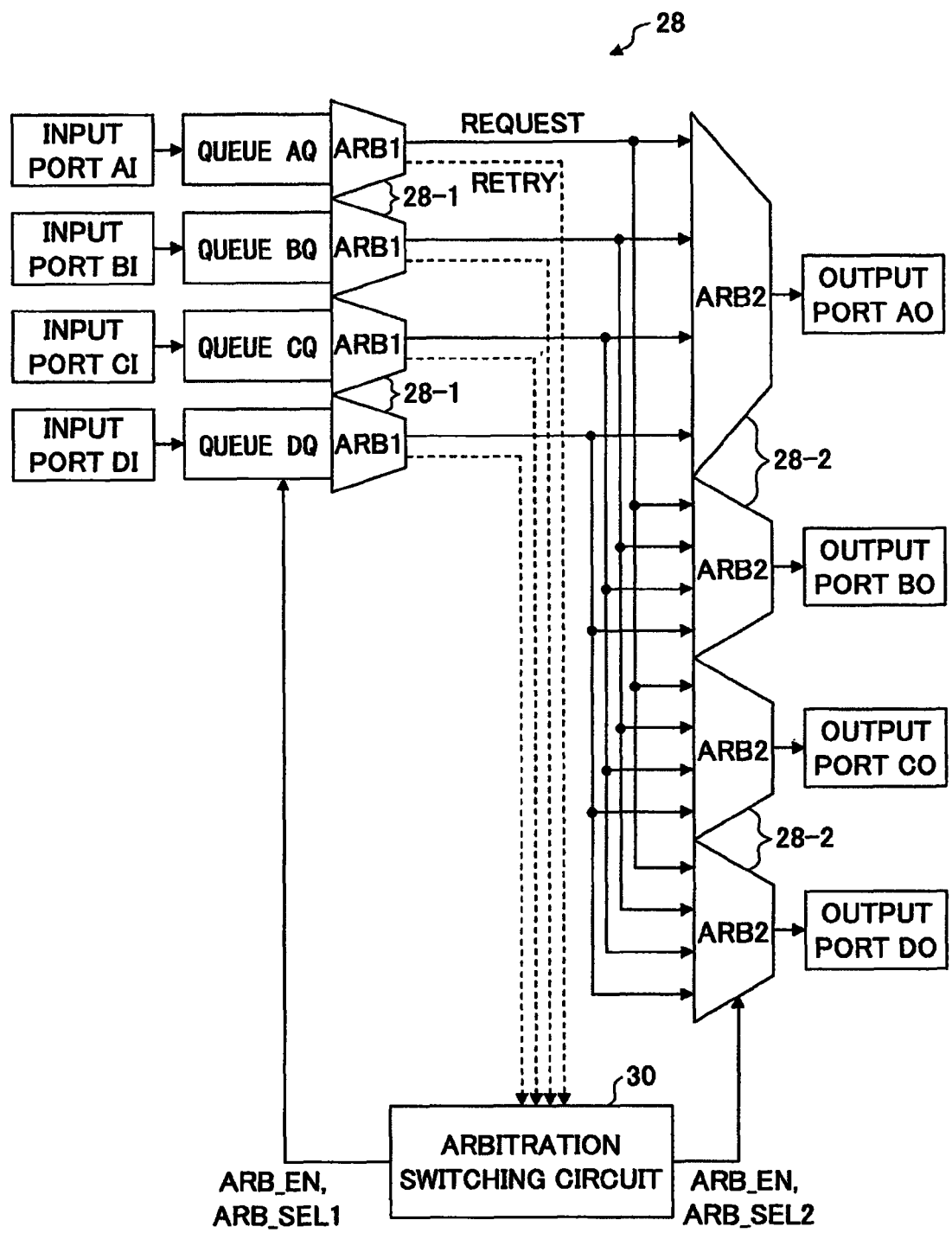
FIG. 5 is a diagram illustrating an example of an arbiter circuit in a first embodiment.

FIG. 5 is a diagram illustrating an example of an arbiter circuit in a first embodiment. It is assumed that an arbiter circuit 28 illustrated in FIG. 5 is provided within the crossbar switch 14 of the parallel computer 1 illustrated in FIG. 1, for example. In FIG. 5, those parts that are the same as those corresponding parts in FIG. 1 are designated by the same reference numerals, and a description thereof will be omitted.

The arbiter circuit 28 illustrated in FIG. 5 includes queue arbiter circuits 28-1, port arbiter circuits 28-2, and an arbitration switching circuit 30. The queue arbiter circuits 28-1 select packets from queues AQ, BQ, CQ and DQ for each of the input ports AI, BI, CI and DI, and the port arbiter circuits 28-2 select one port from the plurality of input ports AI, BI, CI and DI. Hence, the arbiter circuit 28 has the 2-stage structure formed by two kinds of arbiter circuits 28-1 and 28-2.

The queue arbiter circuit 28-1 performs a queue arbitration based on a first arbitration algorithm or a second arbitration algorithm instructed from the arbitration switching circuit 30. Similarly, the port arbiter circuit 28-2 performs a port arbitration based on the first arbitration algorithm or the second arbitration algorithm instructed from the arbitration switching circuit 30.

When an arbitration request from the queue arbiter circuit 28-1 to the port arbiter circuit 28-2 is not accepted (or selected) for a predetermined time, the queue arbiter circuit 28-1 once cancels this arbitration request and reissues another arbitration request. The cancellation of the arbitration request is notified by a retry indicated by dotted lines in FIG. 5.

The arbitration switching circuit 30 monitors a frequency of the retry at each of the input ports AI, BI, CI and DI, and outputs the instruction to switch the arbitration algorithm of the arbiter circuits 28-1 and 28-2 from the first arbitration algorithm to the second arbitration algorithm when the frequency of the retry reaches a threshold value. The arbitration switching circuit 30 supplies an arbitration switching signal ARB_EN and a selection signal ARB_SEL1 instructing the arbitration algorithm to the queue arbiter circuit 28-1, and supplies the arbitration switching signal ARB_EN and a selection signal ARB_SEL2 instructing the arbitration algorithm to the port arbiter circuit 28-2. When the retry frequency reaches the threshold value at each of the input ports AI, BI, CI and DI, the arbitration switching circuit 30 asserts the arbitration switching signal ARB_EN that enables the switching of the arbitration algorithm, in order to instruct the switching of the arbitration algorithms of the arbiter circuits 28-1 and 28-2 to the arbitration algorithms instructed by the selection signals ARB_SEL1 and ARB_SEL2.

The first and second arbitration algorithms are mutually different arbitration algorithms, and in this embodiment, the first arbitration algorithm is the LRU algorithm, and the second arbitration algorithm is the time-division algorithm. Of course, the first arbitration algorithm is not limited to the LRU algorithm, and for example, it is possible to use other algorithms such as a round robin algorithm that makes the selection according to round robin, a fixed priority algorithm that makes the selection according to a fixed priority order, and the like.

Figure 6:
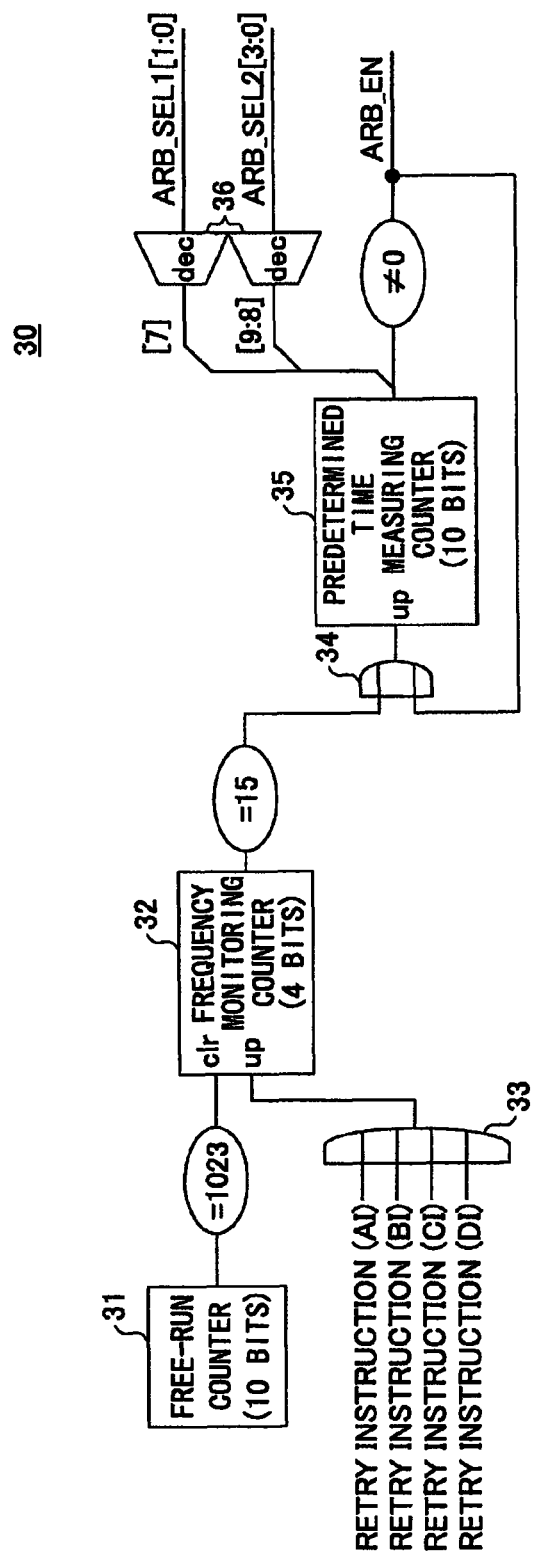
FIG. 6 is a diagram illustrating a structure of an arbitration switching circuit.

FIG. 6 is a diagram illustrating a structure of the arbitration switching circuit 30. The arbitration switching circuit 30 includes a free-run counter 31, a frequency monitoring counter 32, OR circuits 33 and 34, a counter 35 to measure a predetermined time, and a decoder 36 that are connected as illustrated in FIG. 6. In this example, the counters 31, 32, and 35 may be formed by a 10-bit counter, a 4-bit counter, and a 10-bit counter, respectively.

When a counted value of the free-run counter 31 reaches a maximum value (for example, 1024 cycles), a clear signal from the free-run counter 31 is input to a clear terminal clr of the frequency monitoring counter 32 to clear the frequency monitoring counter 32. The retry instruction with respect to each of the input ports AI, BI, CI and DI is input to a count-up terminal up of the frequency monitoring counter 32 via the OR circuit 33, to count by the frequency monitoring counter 32 the number of retry instructions with respect to each of the input ports AI, BI, CI and DI. When the counted number of retry instructions or the retry frequency reaches a threshold value (for example, 15 times/1024 cycles), the frequency monitoring counter 32 inputs a signal to a count-up terminal up of the counter 35 via the OR circuit 34, to start the count of the counter 35. The counter 35 asserts the arbitration switching signal ARB_EN output therefrom while the counter 35 counts the predetermined time (that is, until a counted value exceeds a predetermined value). During the time in which the arbitration switching signal ARB_EN is asserted, the arbitration algorithm is switched from the LRU algorithm to the time-division algorithm. When the counter 35 counts the predetermined time (the counted value exceeds the predetermined value), the counted value becomes 0, and the arbitration switching signal ARB_EN is deasserted, and the arbitration algorithm is switched back to the original LRU algorithm. The arbitration switching signal ARB_EN is feed back to the OR circuit 34. On the other hand, the arbitration switching signal ARB_EN is input to a decoder 36, and the decoder 36 outputs the selection signals ARB_SEL1 and ARB_SEL2.

Figure 7:
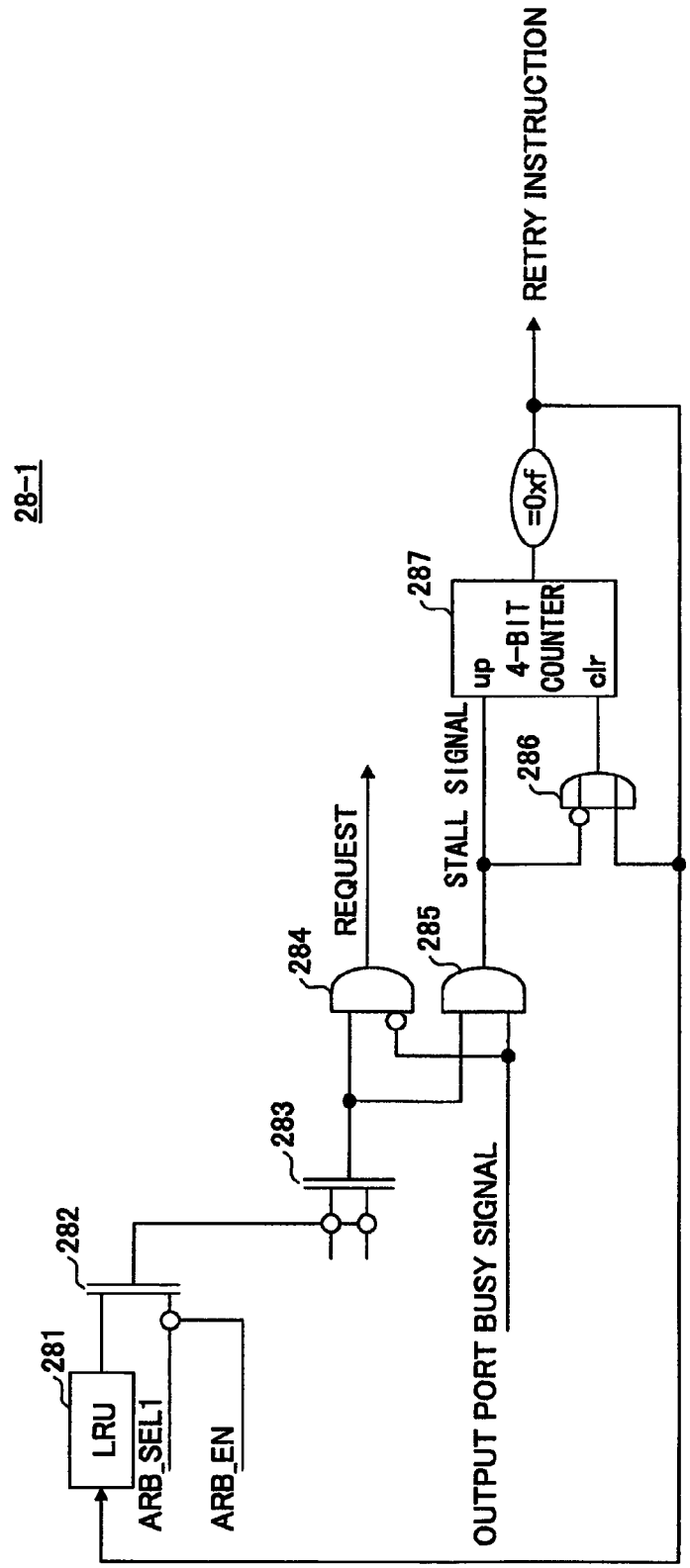
FIG. 7 is a diagram illustrating a structure of a queue arbiter circuit.

FIG. 7 is a diagram illustrating a structure of the queue arbiter circuit 28-1. The port arbiter circuit 28-2 may be realized by a circuit having the same structure as the queue arbiter circuit 28-1, and thus, the illustration and description of the structure of the port arbiter circuit 28-2 will be omitted. When using the arbiter circuit illustrated in FIG. 7 as the port arbiter circuit 28-2, the selection signal ARB_SEL2 is of course input in place of the selection signal ARB_SEL1.

The queue arbiter circuit 28-1 includes a LRU algorithm part 281, selectors 282 and 283, AND circuits 284 and 285, an OR circuit 286, and a counter 287 that are connected as illustrated in FIG. 7. A signal in accordance with the LRU algorithm part 281 and the selection signal ARB_SEL1 are input to the selector 282, and an output of the selector 282 is selected by the arbitration switching signal ARB_EN. For example, the queue AQ at the input port AI is input to the selector 283, and an output of the selector 283 is selected by the output signal of the selector 283. Each of the AND circuits 284 and 285 is input with the output signal of the selector 283 and an output port busy signal. A routing request (path control request) is output from the AND circuit 284.

A stall signal is output from the AND circuit 285 and is input to the OR circuit 286 and to a count-up terminal up of the counter 287. An output signal of the counter 287 is input to the LRU algorithm part 281 and the OR circuit 286, and is input in this case to the arbitration switching circuit 30 as a retry instruction with respect to the input port AI. Because an output signal of the OR circuit 286 is input to a clear terminal clr of the counter 287, the counter 287 is cleared when the counted value of the counter 287 reaches a predetermined value. The counter 287 may be formed by a 4-bit counter, for example.

Accordingly, the queue arbiter circuit 28-1 normally performs the arbitration according to the LRU algorithm of the LRU algorithm part 281, but switches to the arbitration according to the time-division algorithm when the arbitration switching signal ARB_EN is asserted. When the arbitration switching signal ARB_EN is deasserted after a predetermined time, the arbitration algorithm is returned back to the LRU algorithm from the time-division algorithm.

Next, a description will be given of how the livelock may be prevented in this embodiment, by referring to FIGS. 8 through 10. The crossbar switch 14 physically includes a plurality of ports, and a plurality of channels (that is, virtual channels) are logically included in each port, but at an arbitrary point in time, only one channel is selectable at one port.

Figure 8:
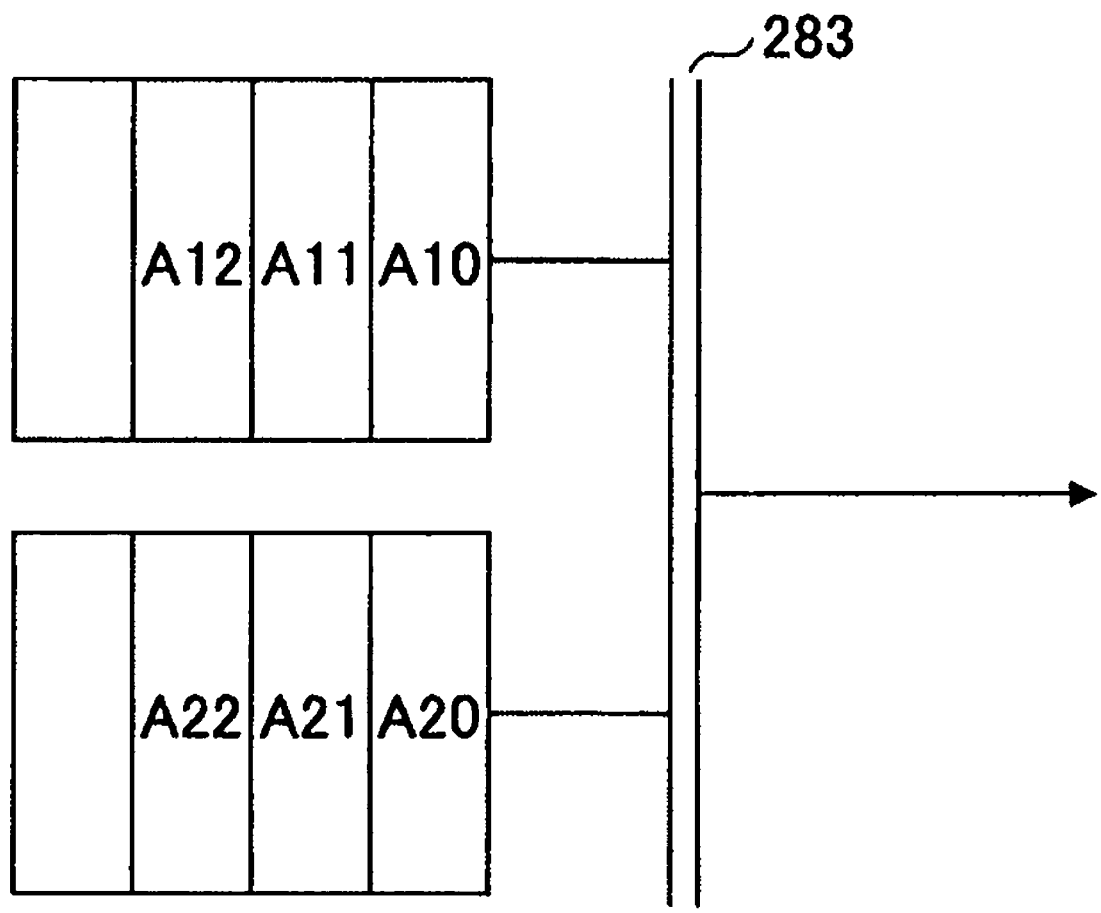
FIG. 8 is a diagram illustrating an example of a state of a queue AQ at an input port AI.

FIG. 8 is a diagram illustrating an example of a state of the queue AQ at the input port AI. FIG. 9 is a diagram illustrating an arbitration result for each clock based on the LRU algorithm, and FIG. 10 is a diagram illustrating an arbitration result for each clock based on the time-division algorithm. FIGS. 9 and 10 illustrate an example in which the output port busy signal of the output port DO, the existence of the retry instruction, and the input ports AI, BI, CI are indicated together with the arbitration result. The busy state of the output port is indicated when the output port busy signal is "1". In addition, the existence of the retry instruction is indicated when the existence of the retry instruction is "1". Further, A1x and A2x indicate packets of the channels C0 and C1 at the input port AI, B1x and B2x indicate packets of the virtual channels C0 and C1 at the input port BI, and C1x and C2x indicate packets of the channels C0 and C1 at the input port CI.

For the sake of convenience, it is assumed that the packets A10, A11 and A12 of the channel C0 and the packets A20, A21 and A22 of the channel C1, intended for the output port DO, are all in the queue AQ at the input port AI and retained in the buffer within the crossbar switch 14. FIG. 8 only illustrates the queue AQ at the input port AI, however, the arbitration described hereunder is of course similarly performed with respect to the input ports BI and CI.

Figure 9:
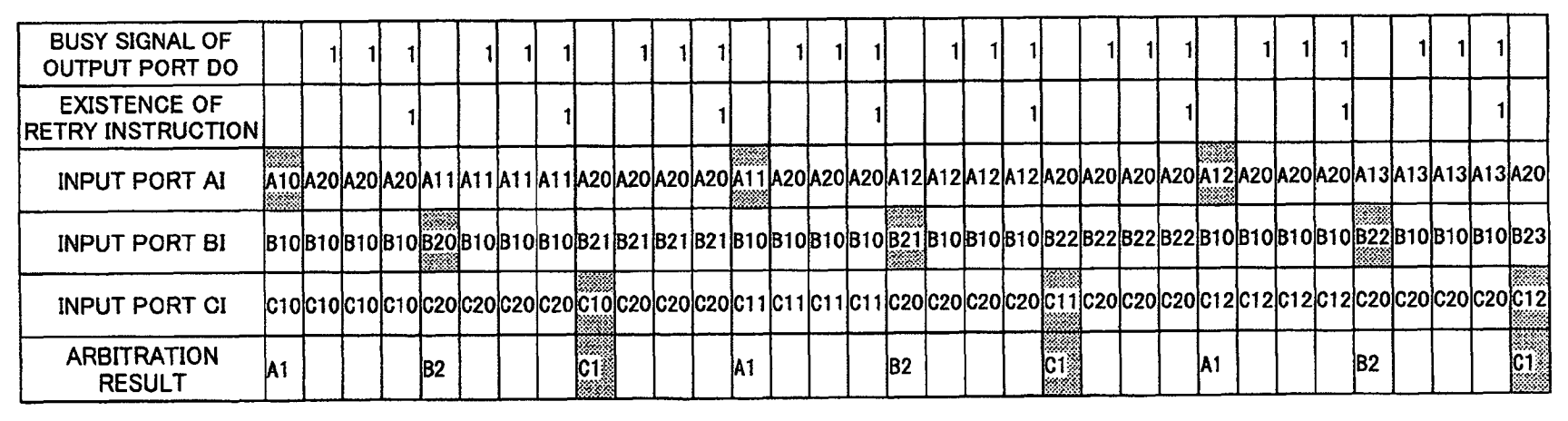

The arbitration from each of the input ports AI, BI and CI to the output port DO is normally performed according to the LRU algorithm, as illustrated in FIG. 9. FIG. 9 illustrates the arbitration in units of cycles, and in a cycle indicating that the output port busy signal is "1" and the output port DO is busy, the arbitration may not be performed because the resource of the output port DO is busy. In addition, in the cycle indicating that the existence of the retry instruction is "1" and the retry instruction exists, the routing request of each of the input ports AI, BI and CI is once cancelled before the arbitration is performed again. Accordingly, the cancelled packet has a lowest priority according to the LRU algorithm. In the example illustrated in FIG. 9, the resource of the output port D0 is steadily busy, and the arbitration is only possible one packet at a time at predetermined intervals. In such a case, when viewed from the input port AI, only the packet A1x of the channel C0 in the queue AQ illustrated in FIG. 8 is processed, and the packet A2x of the channel C1 in the queue AQ remains retained in the buffer within the crossbar switch 14. Furthermore, when a subsequent packet is additionally input or inserted into the queue of the packet A1x of the channel C0, the livelock occurs with respect to the queue of the packet A2x of the channel C1.

On the other hand, when the time-division arbitration algorithm is used as illustrated in FIG. 10 in a situation identical to that described above for FIG. 9, the arbitration is fixedly performed for the same channel and the same input port at predetermined intervals, and such an arbitration is equally allocated to all channels of all input ports. For this reason, it may be seen that the livelock does not occur for some of the channels.

Although the performance of the parallel computer 1 deteriorates if the arbitration is simply performed using the time-division algorithm, the performance deterioration of the parallel computer 1 may be suppressed and the livelock may be prevented, by switching the arbitration algorithm from the LRU algorithm to the time-division algorithm only when there is a possibility of livelock.

According to the first embodiment described above, the switching of the arbitration algorithm is triggered when the frequency of the retry instruction reaches the threshold value. However, the trigger for the switching of the arbitration algorithm may be other than the frequency of the retry instruction.

Figure 11:
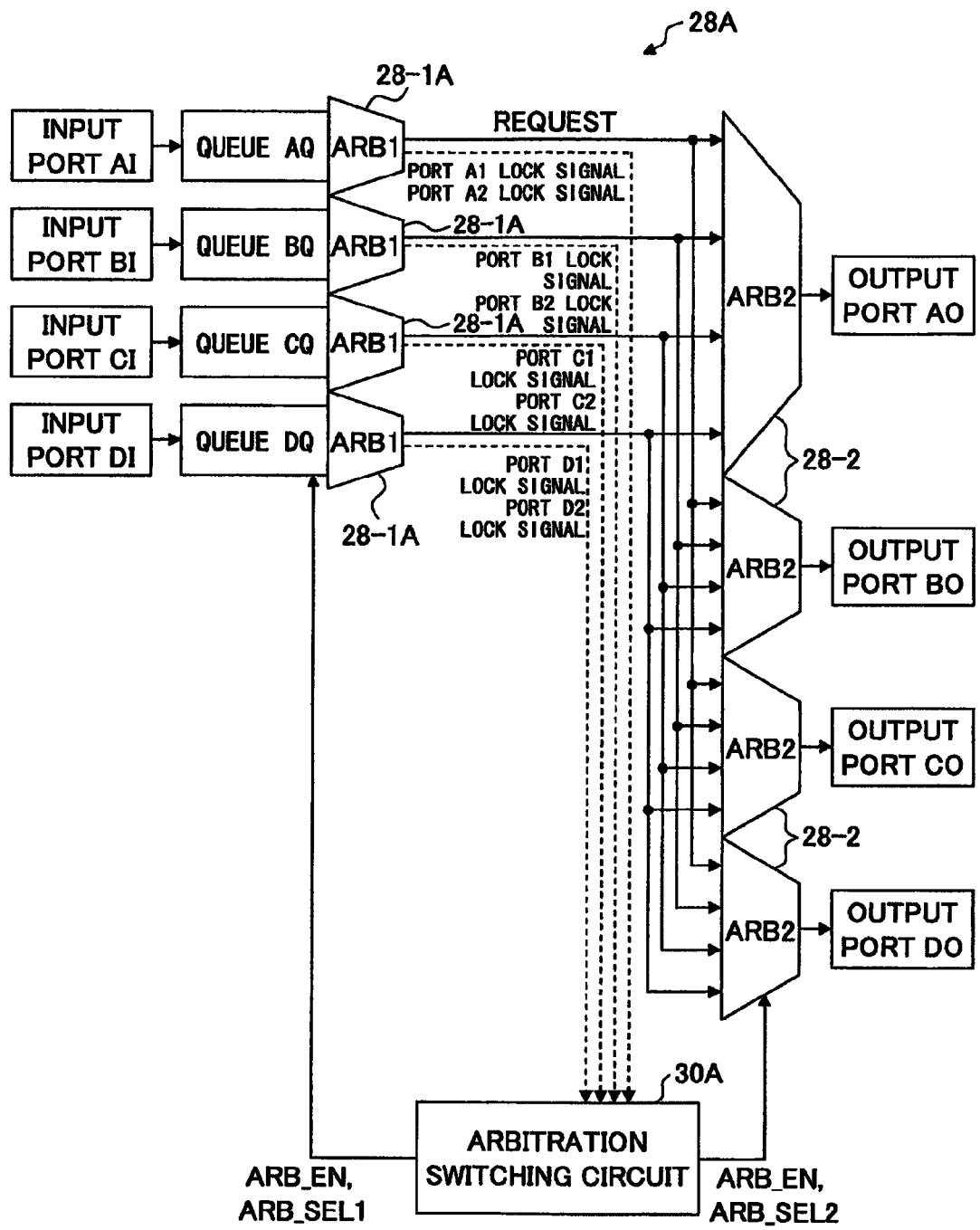
FIG. 11 is a diagram illustrating an example of an arbiter circuit in a second embodiment.

FIG. 11 is a diagram illustrating an example of an arbiter circuit in a second embodiment. It is assumed for the sake of convenience that an arbiter circuit 28A illustrated in FIG. 11 is provided within the crossbar switch 14 of the parallel computer 1 illustrated in FIG. 1, for example. In FIG. 11, those parts that are the same as those corresponding parts in FIG. 5 are designated by the same reference numerals, and a description thereof will be omitted.

This embodiment differs from the first embodiment described above, in that lock information for each of the input ports AI, BI, CI and DI is supplied from a corresponding queue arbiter circuit 28-1A to an arbitration switching circuit 30A.

Figure 12:
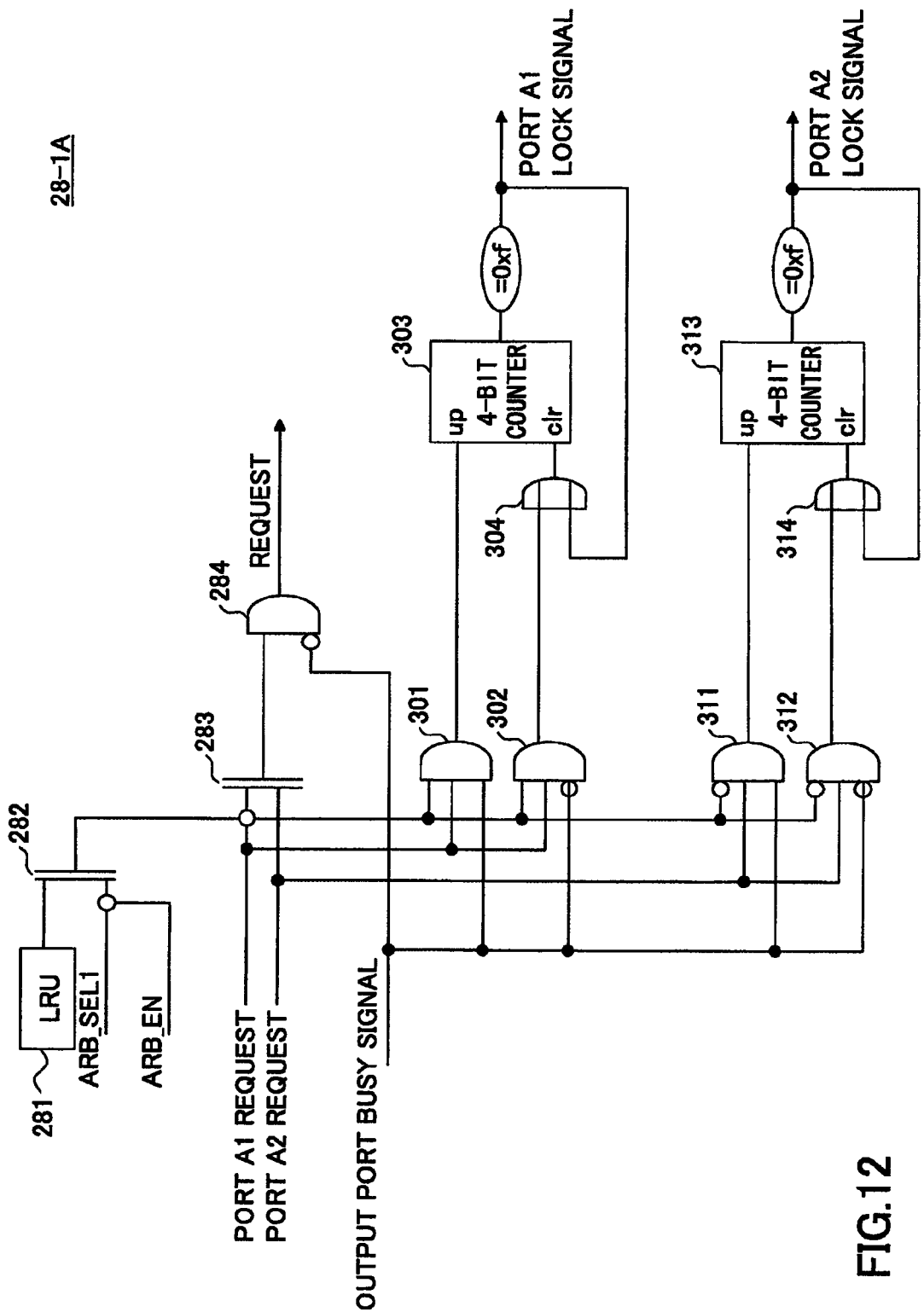
FIG. 12 is a diagram illustrating a structure of a queue arbiter circuit.

FIG. 12 is a diagram illustrating a structure of the queue arbiter circuit 28-1A. In FIG. 12, those parts that are the same as those corresponding parts in FIG. 7 are designated by the same reference numerals, and a description thereof will be omitted. In FIG. 12, the output signal of the selector 282, the output port busy signal, and the packet A1x (routing request) of the channel C0 at the input port AI are input to each of AND circuits 301 and 302. The output signal of the selector 282, the output port busy signal, and the packet A2x (routing request) of the channel C1 at the input port AI are input to each of AND circuits 311 and 312.

In FIG. 12, a high-level output signal of the AND circuit 301 indicates that the arbitration is not performed with respect to the packet A1x of the channel C0 at the input port AI, and the output signal of the AND circuit 301 is input to a count-up terminal up of a counter 303. A high-level output signal of the AND circuit 302 indicates that the arbitration is performed with respect to the packet A1x of the channel C0 at the input port AI, and the output signal of the AND circuit 302 is input to a clear terminal clr of the counter 303 via an OR circuit 304. The counter 303 may be formed by a 4-bit counter, for example. An output signal of the counter 303 is output to the arbitration switching circuit 30A as a port A1 lock signal to lock the packet A1x of the channel C0 at the input port AI, and is also fed back to the OR circuit 304. When a counted value of the counter 303 reaches a predetermined value, the output signal (port A1 lock signal) of the counter 303 indicates that the packet A1x of the channel C0 at the input port AI is in a deadlock state.

A high-level output signal of the AND circuit 311 indicates that the arbitration is not performed with respect to the packet A2x of the channel C1 at the input port AI, and the output signal of the AND circuit 311 is input to a count-up terminal up of a counter 313. A high-level output signal of the AND circuit 312 indicates that the arbitration is performed with respect to the packet A2x of the channel C1 at the input port AI, and the output signal of the AND circuit 312 is input to a clear terminal clr of the counter 313 via an OR circuit 314. The counter 313 may be formed by a 4-bit counter, for example. An output signal of the counter 313 is output to the arbitration switching circuit 30A as a port A2 lock signal to lock the packet A2x of the channel C1 at the input port AI, and is also fed back to the OR circuit 314. When a counted value of the counter 313 reaches a predetermined value, the output signal (port A2 lock signal) of the counter 313 indicates that the packet A2x of the channel C1 at the input port AI is in a deadlock state.

Figure 13:
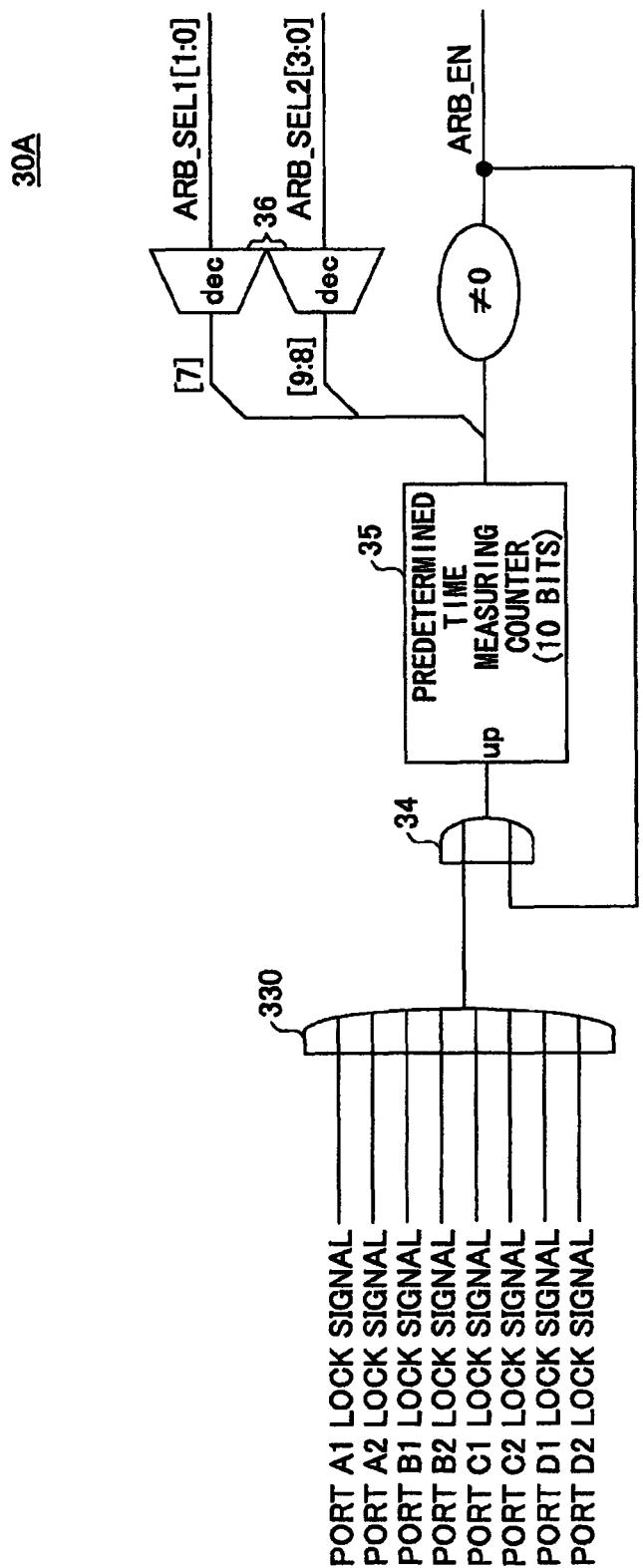
FIG. 13 is a diagram illustrating a structure of an arbitration switching circuit.

FIG. 13 is a diagram illustrating a structure of the arbitration switching circuit 30A. In FIG. 13, those parts that are the same as those corresponding parts in FIG. 5 are designated by the same reference numerals, and a description thereof will be omitted.

The arbitration switching circuit 30A includes OR circuits 330 and 34, the counter 35 to measure a predetermined time, and the decoder 36 that are connected as illustrated in FIG. 13. The lock information detected in each queue arbiter circuit 28-1A, that is, the port A1 lock signal and the port A2 lock signal with respect to the input port AI, a port B1 lock signal and a port B2 lock signal with respect to the input port BI, a port C1 lock signal and a port C2 lock signal with respect to the input port CI, and a port D1 lock signal and a port D2 lock signal with respect to the input port DI, are input to the OR circuit 330. An output signal of the OR circuit 330 is supplied to one input of the OR circuit 34.

When the lock information from each of the input ports AI, BI, CI and DI is input, the arbitration switching signal ARB_EN is asserted while the counter 35 counts the predetermined time (that is, until the counted value exceeds the predetermined value). During the time in which the arbitration switching signal ARB_EN is asserted, the arbitration algorithm is switched from the LRU algorithm to the time-division algorithm. When the counter 35 counts the predetermined time (the counted value exceeds the predetermined value), the counted value becomes 0 and the arbitration switching signal ARB_EN is deasserted, to thereby return the arbitration algorithm back to the original LRU algorithm.

Therefore, according to this embodiment, the arbitration algorithm may be switched using the deadlock in at least one of the input ports as the trigger.

Figure 14:
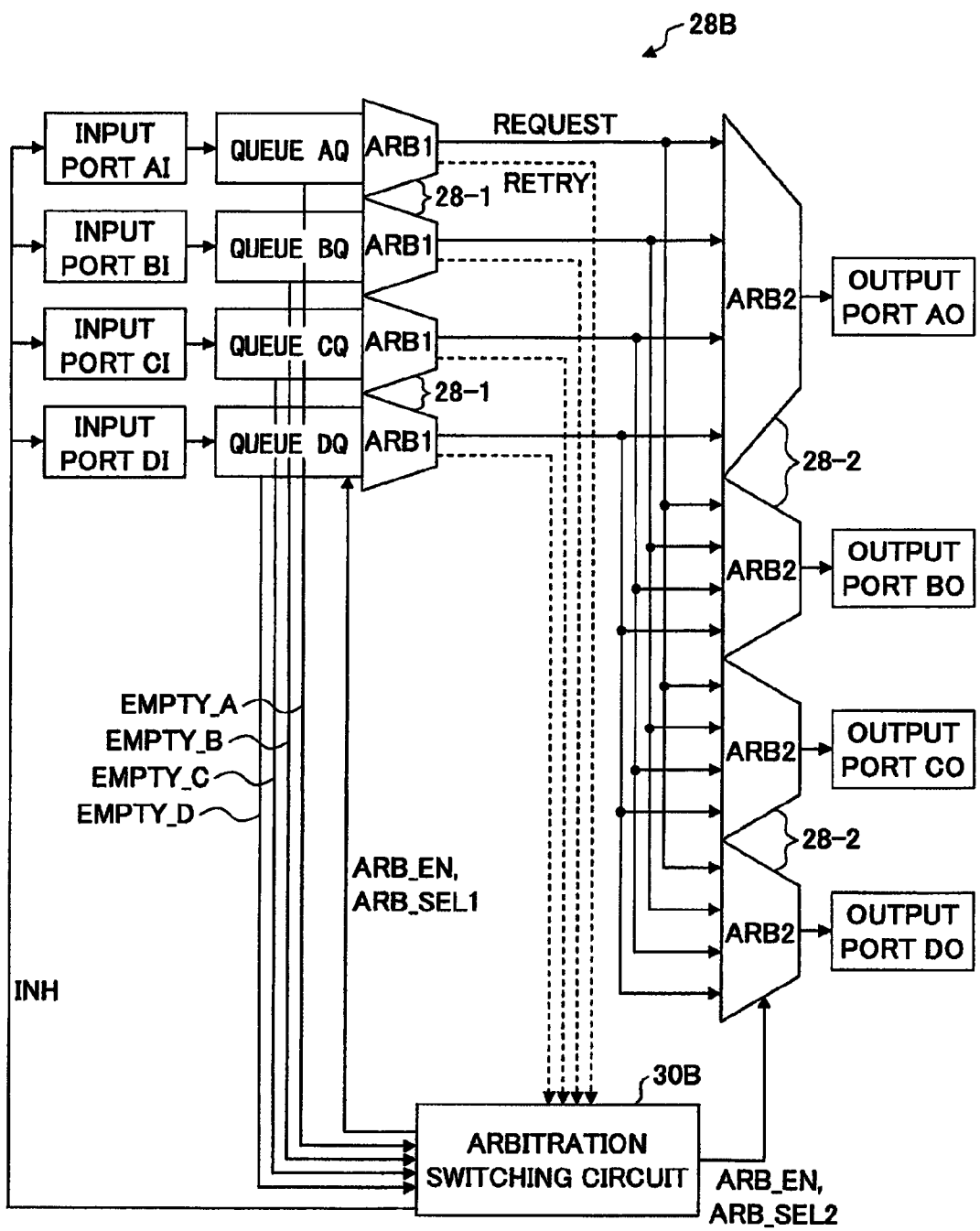
FIG. 14 is a diagram illustrating an example of an arbiter circuit in a third embodiment.

FIG. 14 is a diagram illustrating an example of an arbiter circuit in a third embodiment. It is assumed that an arbiter circuit 28B illustrated in FIG. 14 is provided within the crossbar switch 14 of the parallel computer 1 illustrated in FIG. 1, for example. In FIG. 14, those parts that are the same as those corresponding parts in FIG. 5 are designated by the same reference numerals, and a description thereof will be omitted.

This embodiment differs from the first embodiment described above in that, empty signals EMPTY_A, EMPTY_B, EMPTY_C and EMPTY_D respectively indicating that the queues AQ, BQ, CQ and DQ at each of the input ports AI, BI, CI and DI are empty are supplied from the buffer to an arbitration switching circuit 30B. In addition, during a time in which the arbitration switching circuit 30B switches the arbitration algorithm from the LRU algorithm to the time-division algorithm, an inhibit signal INH that inhibits input or insertion of the packet is supplied to each of the input ports AI, BI, CI and DI.

Figure 15:
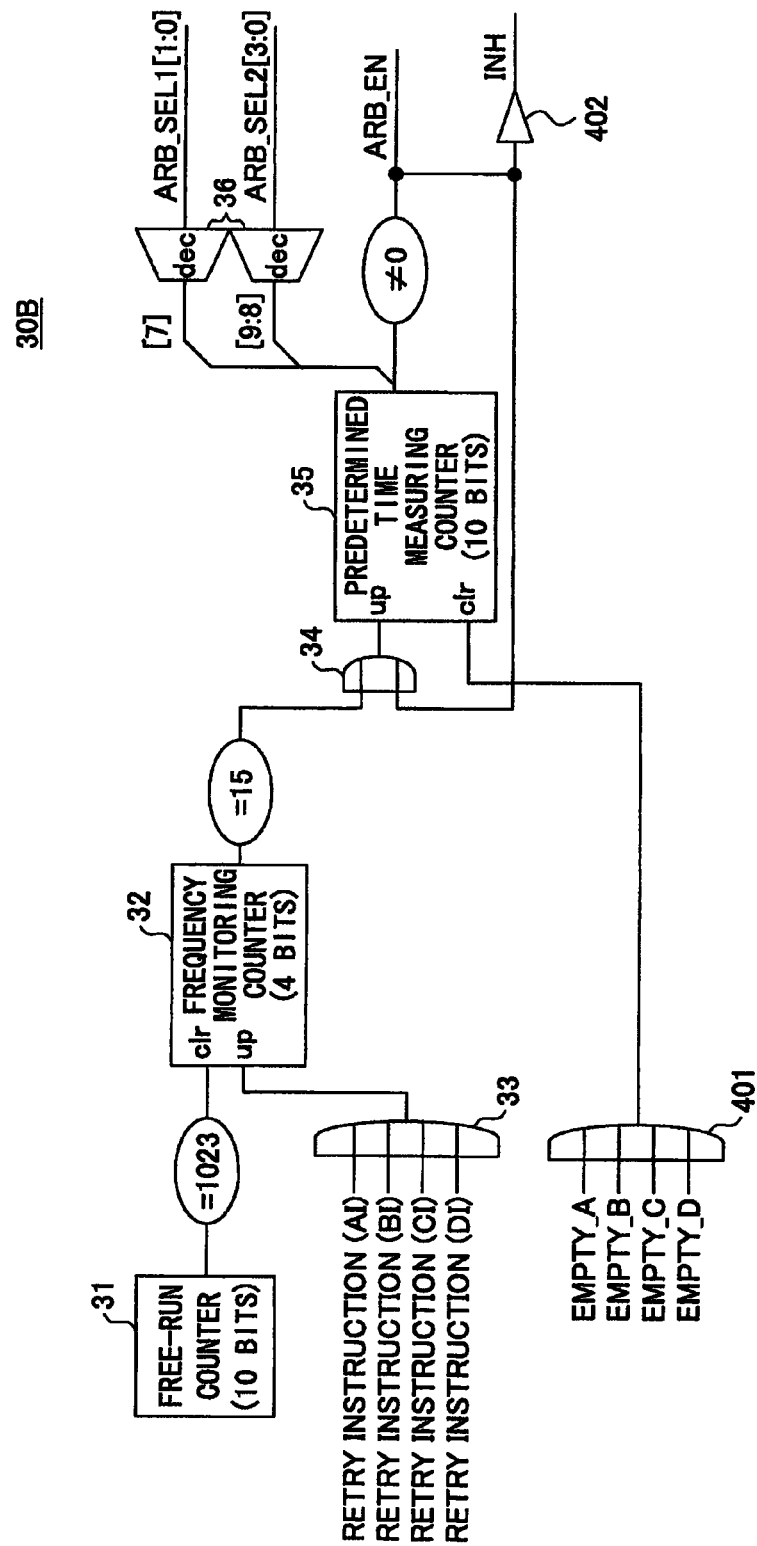
FIG. 15 is a diagram illustrating a structure of an arbitration switching circuit.

FIG. 15 is a diagram illustrating a structure of the arbitration switching circuit 30B. In FIG. 15, those parts that are the same as those corresponding parts in FIG. 6 are designated by the same reference numerals, and a description thereof will be omitted.

In FIG. 15, the empty signals EMPTY_A, EMPTY_B, EMPTY_C and EMPTY_D respectively indicating that the queues AQ, BQ, CQ and DQ at each of the input ports AI, BI, CI and DI are empty are input from the buffer to an AND circuit 401. An output signal of the AND circuit 401 is input to the clear terminal clr of the counter 35. Hence, when all of the empty signals EMPTY_A, EMPTY_B, EMPTY_C and EMPTY_D from the queues AQ, BQ, CQ and DQ are asserted, the counted value of the counter 35 is cleared to 0 even before the measurement of the predetermined time ends. In addition, the arbitration switching signal ARB_EN output from the counter 35 is input to each of the input ports AI, BI, CI and DI as the inhibit signal INH via a buffer 402.

Hence, during a time in which the arbitration switching signal ARB_EN is asserted, the input or insertion of the packet to each of the input ports AI, BI, CI and DI is inhibited because the asserted inhibit signal INH is supplied to each of the input ports AI, BI, CI and DI. On the other hand, although the arbitration algorithm is switched from the LRU algorithm to the time-division algorithm during the time in which the arbitration switching signal ARB_EN is asserted, the counted value of the counter 35 is cleared to 0 at the time when all of the queues AQ, BQ, CQ and DQ at each of the input ports AI, BI, CI and DI become empty and all of the empty signals EMPTY_A, EMPTY_B, EMPTY_C and EMPTY_D are asserted. When the counted value of the counter 35 is cleared, the arbitration switching signal ARB_EN is deasserted, and thus, the arbitration algorithm is switched back to the original LRU algorithm.

Therefore, in this embodiment, the switching of the arbitration algorithm is triggered when the frequency of the retry instruction reaches the threshold value, and the switching of the arbitration algorithm back to the original arbitration algorithm is triggered when each of the queues AQ, BQ, CQ and DQ becomes empty and no more packet exists therein.

The disclosed arbitration method, arbiter circuit, and apparatus provided with the arbiter circuit may be applied to various apparatuses requiring an arbitration process, such as a crossbar switch, a parallel computer provided with the crossbar switch, and the like.

The disclosed arbitration method, arbiter circuit, and apparatus provided with the arbiter circuit are described by way of embodiments, however, the present invention is not limited to these embodiments, and various variations and modifications may be made without departing from the scope of the present invention.

Although the embodiments are numbered with, for example, "first," "second," or "third," the ordinal numbers do not imply priorities of the embodiments. Many other variations and modifications will be apparent to those skilled in the art.

All examples and conditional language recited herein are intended for pedagogical purposes to aid the reader in understanding the invention and the concepts contribute by the inventor to furthering the art, and are to be construed as being without limitation to such specifically recited examples and conditions, nor does the organization of such examples in the specification related to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An arbitration method comprising:
    transferring data from a plurality of input ports each having a plurality of virtual channels of which only one channel is selectable at one input port at an arbitrary point in time, to an arbitrary output port amongst a plurality of output ports by performing an arbitration among the channels of each of the plurality of input ports according to an arbitrary arbitration algorithm other than a time-division algorithm;
    arbitrating among the plurality of input ports according to the arbitrary arbitration algorithm; and
    switching the arbitrary arbitration algorithm used in the transferring and the arbitrating to the time-division algorithm for a predetermined time in response to a trigger,
    wherein the arbitrary arbitration algorithm performs a queue arbitration, and the arbitrating performs a port arbitration.

2. The arbitration method as claimed in claim 1, wherein a retry instruction to once cancel a path control request from an arbitrary input port is outputted with respect to the arbitrary input port when the path control request from the arbitrary input port is not accepted in the transferring for a predetermined time, in order to perform the arbitration again in the arbitrating, and the trigger is generated when a frequency of the retry instruction reaches a threshold value.

3. The arbitration method as claimed in claim 2, wherein the arbitration algorithm is returned to the arbitrary arbitration algorithm in response to another trigger that is generated when each queue at the plurality of input ports becomes empty.

4. The arbitration method as claimed in claim 1, wherein the trigger is generated when a deadlock is detected in at least one of the plurality of input ports in the transferring.

5. The arbitration method as claimed in claim 1, wherein the arbitrary arbitration algorithm is selected from a group including Least Recently Used algorithm, round robin algorithm, and fixed priority algorithm.

6. An arbiter circuit comprising:
    a transfer circuit that transfers data from a plurality of input ports each having a plurality of virtual channels of which only one channel is selectable at one input port at an arbitrary point in time, to an arbitrary output port amongst a plurality of output ports by performing an arbitration among the channels of each of the plurality of input ports according to an arbitrary arbitration algorithm other than a time-division algorithm;
    an arbiter that arbitrates among the plurality of input ports according to the arbitrary arbitration algorithm; and
    an arbitration switching circuit that switches the arbitrary arbitration algorithm used in the transfer circuit and the arbiter to the time-division algorithm for a predetermined time in response to a trigger,
    wherein the arbitrary arbitration algorithm performs a queue arbitration, and the arbiter performs a port arbitration.

7. The arbiter circuit as claimed in claim 6,
    wherein a retry instruction to once cancel a path control request from an arbitrary input port is outputted with respect to the arbitrary input port when the path control request from the arbitrary input port is not accepted in the arbiter for a predetermined time, in order to perform the arbitration again in the transfer circuit, and wherein the arbitration switching circuit uses the trigger that is generated when a frequency of the retry instruction reaches a threshold value.

8. The arbiter circuit as claimed in claim 7, wherein the arbitration switching circuit returns the arbitration algorithm to the arbitrary arbitration algorithm in response to another trigger that is generated when each queue at the plurality of input ports becomes empty.

9. The arbiter circuit as claimed in claim 6, wherein the arbitration switching circuit uses the trigger that is generated when a deadlock is detected in at least one of the plurality of input ports in the transfer circuit.

10. The arbiter circuit as claimed in claim 6, wherein the arbitrary arbitration algorithm is selected from a group including Least Recently Used algorithm, round robin algorithm, and fixed priority algorithm.

11. An apparatus for coupling a system having a plurality of processors and memories to an input output system having a plurality of input output interfaces, the apparatus comprising:
- a plurality of input ports that each includes a plurality of virtual channels;
- a plurality of output ports;
- a transfer circuit that transfers data from the plurality of input ports each having a plurality of virtual channels of which only one channel is selectable at one input port at an arbitrary point in time, to an arbitrary output port amongst the plurality of output ports by performing an arbitration among the channels of each of the plurality of input ports according to an arbitrary arbitration algorithm other than a time-division algorithm;
- an arbiter that arbitrates among the plurality of input ports according to the arbitrary arbitration algorithm; and
- an arbitration switching circuit that switches the arbitrary arbitration algorithm used in the transfer circuit and the arbiter to the time-division algorithm for a predetermined time in response to a trigger, wherein the arbitrary arbitration algorithm performs a queue arbitration, and the arbiter performs a port arbitration.

12. The apparatus as claimed in claim 11, wherein a retry instruction to once cancel a path control request from an arbitrary input port is outputted with respect to the arbitrary input port when the path control request from the arbitrary input port is not accepted in the arbiter for a predetermined time, in order to perform the arbitration again in the transfer circuit, and wherein the arbitration switching circuit uses the trigger that is generated when a frequency of the retry instruction reaches a threshold value.

13. The apparatus as claimed in claim 12, wherein the arbitration switching circuit returns the arbitration algorithm to the arbitrary arbitration algorithm in response to another trigger that is generated when each queue at the plurality of input ports becomes empty.

14. The apparatus as claimed in claim 11, wherein the arbitration switching circuit uses the trigger that is generated when a deadlock is detected in at least one of the plurality of input ports in the transfer circuit.

15. The apparatus as claimed in claim 11, wherein the arbitrary arbitration algorithm is selected from a group including Least Recently Used algorithm, round robin algorithm, and fixed priority algorithm.

* * * * *